United States Patent
Redekop et al.

(10) Patent No.: US 10,686,753 B2
(45) Date of Patent: Jun. 16, 2020

(54) METHOD AND ROUTER TO PERMIT OR BLOCK INTERNET PROTOCOL (IP) CONNECTIVITY BASED ON ORIGINATING DOMAIN NAME SERVER (DNS) REQUESTS

(71) Applicant: DNSthingy Inc., London (CA)

(72) Inventors: David Redekop, London (CA); Tomas Trebicky, London (CA)

(73) Assignee: DNSthingy Inc., London, Ontario (CA)

( * ) Notice: Subject to any disclaimer, the term of this patent is extended or adjusted under 35 U.S.C. 154(b) by 148 days.

(21) Appl. No.: 15/648,811

(22) Filed: Jul. 13, 2017

(65) Prior Publication Data
US 2018/0019968 A1    Jan. 18, 2018

Related U.S. Application Data

(60) Provisional application No. 62/361,784, filed on Jul. 13, 2016.

(51) Int. Cl.
*G06F 15/173* (2006.01)
*H04L 29/12* (2006.01)
*H04L 29/06* (2006.01)
*H04L 12/911* (2013.01)

(52) U.S. Cl.
CPC .......... *H04L 61/2007* (2013.01); *H04L 47/70* (2013.01); *H04L 61/1511* (2013.01); *H04L 63/0236* (2013.01); *H04L 63/101* (2013.01); *H04L 61/6018* (2013.01)

(58) Field of Classification Search
None
See application file for complete search history.

(56) References Cited

U.S. PATENT DOCUMENTS

| | | |
|---|---|---|
| 6,526,450 B1 | 2/2003 | Zhang et al. |
| 7,792,994 B1 | 9/2010 | Hernacki |
| 8,990,356 B2 * | 3/2015 | McPherson ......... H04L 61/1511 709/219 |
| 2008/0147837 A1 * | 6/2008 | Klein ................ H04L 29/12066 709/223 |
| 2008/0184357 A1 | 7/2008 | Drako |
| 2010/0036969 A1 * | 2/2010 | Perry ................ H04L 29/12066 709/245 |

(Continued)

FOREIGN PATENT DOCUMENTS

WO    2015/134933    9/2015

OTHER PUBLICATIONS

Extended European Search Report for European Patent Application No. 17181204.3.

(Continued)

*Primary Examiner* — Phuoc H Nguyen
(74) *Attorney, Agent, or Firm* — Ridout & Maybee LLP

(57) ABSTRACT

A router and method for validating Domain Name Service (DNS) queries which can include sending them upstream. Internet Protocol Enforcement (IPE) is included into the router to allow passage of Transmission Communication Protocol (TCP) and User Datagram Protocol (UDP) traffic through a compatible gateway only when the destination IP address was the result of a prior validated DNS query still in its TTL (time to live) period. IP packets that did not originate with a DNS query can be blocked by default, for example.

17 Claims, 5 Drawing Sheets

(56) References Cited

U.S. PATENT DOCUMENTS

| | | | | |
|---|---|---|---|---|
| 2010/0121981 | A1* | 5/2010 | Drako | H04L 61/1511 709/245 |
| 2011/0078309 | A1* | 3/2011 | Bloch | H04L 29/12066 709/224 |
| 2011/0282997 | A1* | 11/2011 | Prince | G06F 16/958 709/226 |
| 2012/0023153 | A1 | 1/2012 | Karasaridis | |
| 2015/0058488 | A1* | 2/2015 | Backholm | H04L 61/1511 709/226 |
| 2015/0215267 | A1* | 7/2015 | Kagan | H04L 61/1511 709/245 |
| 2016/0380960 | A1* | 12/2016 | Pandrangi | H04L 61/1511 709/224 |

OTHER PUBLICATIONS

Blacklist/DNSthingy; Malware protection from mistyped.OM URLS (http://www.dsthingy.com/2016/03/malware-protection-from-mistyped-om-urls/).

Case Study/DNSthingy; Ad-free iOS apps (http://www.dnsthingy.com/2015/12/ad-free-ios-apps/).

DNS/DNSthingy; New SafeSearch option includes Bing (http://www.dnsthingy.com/2016/06/new-sagesearch-option-includes-bing/).

Feature/DNSthingy; New SafeSearch option includes Bing (http://www.dnsthingy.com/2016/06/new-safesearch-option-includes-bing/).

Security/DNSthingy; Real SSL certificate on our firmware (https://www.dnsthingy.com/2015/12/real-ssl-certificate-on-our-firmware/).

VPN/DNSthingy; Good and bad reasons to use a VPN (https://www.dnsthingy.com/2014/03/good-and-bad-reasons-to-use-a-vpn/).

Whitelist/DNSthingy; See what is going on / new real-time logging feature (https://www.dnsthingy.com/2015/10/see-what-in-going-on-real-time-logging/).

Communication pursuant to Article 94(3) EPC dated May 29, 2019 from the European Patent Office for Corresponding European Patent Application No. 17181204.3.

* cited by examiner

METHOD AND ROUTER TO PERMIT OR BLOCK INTERNET PROTOCOL (IP) CONNECTIVITY BASED ON ORIGINATING DOMAIN NAME SERVER (DNS) REQUESTS

CROSS-REFERENCE TO RELATED APPLICATIONS

The present application claims the benefit of priority from U.S. Provisional Patent Application No. 62/361,784 filed Jul. 13, 2016 entitled METHOD AND ROUTER TO PERMIT OR BLOCK INTERNET PROTOCOL (IP) CONNECTIVITY BASED ON ORIGINATING DOMAIN NAME SERVER (DNS) REQUESTS, the contents of which are incorporated herein by reference.

TECHNICAL FIELD

At least some example embodiments relate to the field of computer networks, routers, and Domain Name Server (DNS) queries.

BACKGROUND

The Transmission Control Protocol/Internet Protocol (TCP/IP) is a networking protocol which has become ubiquitous with the Internet. TCP/IP provides end-to-end communication between users on the internet. Users may send and receive information with each other regardless of geographic location or the type of host and/or interconnected network being used. TCP/IP defines how data should be encapsulated into packets, addressed, transmitted, routed and received. The packets contain header information that included both the source and destination addresses which are expressed in numerical formats known as IP addresses. The packets are routed through the Internet until they are received by a host having an IP address that matches the packet's destination address. This enables users to send and receive information with each other through their respective host computers.

Since IP addresses are expressed in a numerical format, the Domain Name Service (DNS) was formed to use "human-readable" addresses or "domain names" and allows these names to be resolved to unique IP addresses. DNS consists of a worldwide hierarchy of servers containing network names/addresses databases.

Sometimes an upstream DNS resolver is used to assist in resolving a DNS query. For example, when all user queries are sent to the same upstream DNS resolver, this allows the resolver to create user profiles by collecting data based on the history of user behaviour, which can be a privacy concern.

Sometimes selection of an upstream DNS resolver is made at the end-user device level. This can lead to vulnerabilities and susceptibility in the overall network, can lead to inconsistencies in protocols for the different user devices of the network, and/or can result in unnecessary packet requests that ultimately would be rejected by the destination endpoint.

Additional difficulties with existing systems may be appreciated in view of the Detailed Description of Example Embodiments herein below.

SUMMARY

Example embodiments relate to methods and routers which permit passage of Internet Protocol (IP) connectivity when originating requests were resolved by the Domain Name Server (DNS) query, and to otherwise block IP connectivity as a default.

In an example embodiment, the method and router can be for Internet Protocol Enforcement (WE) to funnel TCP and User Datagram Protocol (UDP) traffic through a compatible gateway only when the destination IP is identified as the result of a prior DNS query still in its TTL (time to live) period. All IP connectivity that does not originate with a DNS query can be blocked by default. The IPE can be configured within firmware of the router, for example. An example embodiment of the WE can use a source-destination filter lookup table stored in the router to pass received traffic.

In an example embodiment, there is provided a method performed by a router which provides connectivity between a local network and a backhaul network, wherein the local network includes a requestor device. The method includes: receiving, from the requestor device, a Domain Name Service (DNS) request including a domain name query; validating the DNS request; sending a resolved address based from said validating of the DNS request; receiving traffic which identifies an address; and permitting passage of the traffic in dependence of verifying that the address is any one of the resolved addresses.

In another example embodiment, there is provided a method performed by a router which provides connectivity between a local network and a backhaul network, wherein the local network includes a requestor device. The method includes: receiving, from the requestor device, a Domain Name Service (DNS) request including a domain name query; validating the DNS request; sending a resolved address based from said validating of the DNS request; receiving traffic which identifies an address; and permitting passage of the traffic in dependence of verifying that the address identifies the requestor device.

In another example embodiment, there is provided a method performed by a router which provides connectivity between a local network and a backhaul network, wherein the local network includes a requestor device and the backhaul network includes a plurality of upstream Domain Name Service (DNS) resolvers. The method includes receiving, from the requestor device, a DNS request including a domain name query; validating the request including, based on one or more rules, sending the DNS request to a selected one of the plurality of upstream DNS resolvers; and sending a validation response to the DNS request to the requestor device. One or more rules include at least one or a combination or sub-combination of:
1) authoritative pairs,
2) rainbow list,
3) black list,
4) override,
5) white list,
6) virtual relocation, and
7) resolver of last resort.

In another example embodiment, the method is performed in the above-noted specified order of 1) to 7).

In an example embodiment, there is provided a router for providing connectivity between a local network and a backhaul network, the router includes: memory; a first network interface configured to interface with the local network, including a requestor device within the local network; a second network interface configured to interface with the backhaul network; and one or more processor configured to perform the described methods.

In an example embodiment, there is provided a non-transitory computer readable medium comprising instructions which are executable by one or more processors of a router, wherein the router provides connectivity between a local network and a backhaul network, the instructions include instructions for performing the described methods.

BRIEF DESCRIPTION OF THE DRAWINGS

Embodiments will now be described, by way of example only, with reference to the attached Figures, wherein.

Like reference numerals may be used throughout the Figures to denote similar elements and features.

DETAILED DESCRIPTION OF EXAMPLE EMBODIMENTS

The ubiquity of the Internet has led to an assumption that any device can access any destination, any port, and any service. As connectivity has reached this high level of saturation, so has criminal opportunity. This cat-and-mouse game between organized cybercrime and IT security efforts is becoming an ever more granular process.

Example embodiments relate to methods and routers which permit passage of Internet Protocol (IP) connectivity when originating requests were resolved by the Domain Name Server (DNS) query, and to otherwise block IP connectivity as a default.

In an example embodiment, there is provided Internet Protocol Enforcement (WE) to funnel TCP and UDP traffic through a compatible gateway only when the destination IP is identified as the result of a prior DNS query still in its TTL (time to live) period. In an example embodiment, all IP connectivity that does not originate with a validated DNS query can be blocked by default. One or more other match rules can also be implemented. The WE can be configured within firmware of the router, for example. An example embodiment of the IPE can use a source-destination filter lookup table stored in the router to pass through received traffic.

In an example embodiment, one or more DNS queries are received from source requestor devices from a local network, and validated by the router, either internally or externally. After DNS validation, source-destination-time-to-live (SDTTL) tuples (or source-destination pairs or stored sets) can be stored in memory of the router, along with other ordered sets or rules. When an IP packet reaches the router over the local network, one or more match rules can be used to filter the IP packet. In an example embodiment, the tuples can be used to match or verify the source, the destination, and the TTL against the IP packet (e.g. the header). If the IP packet is verified, the IP packet is permitted to pass and sent to the IP address of the destination endpoint that was identified in the IP packet. Otherwise, in an example embodiment, the IP packet is blocked as a default.

Figures 1A, 1B:
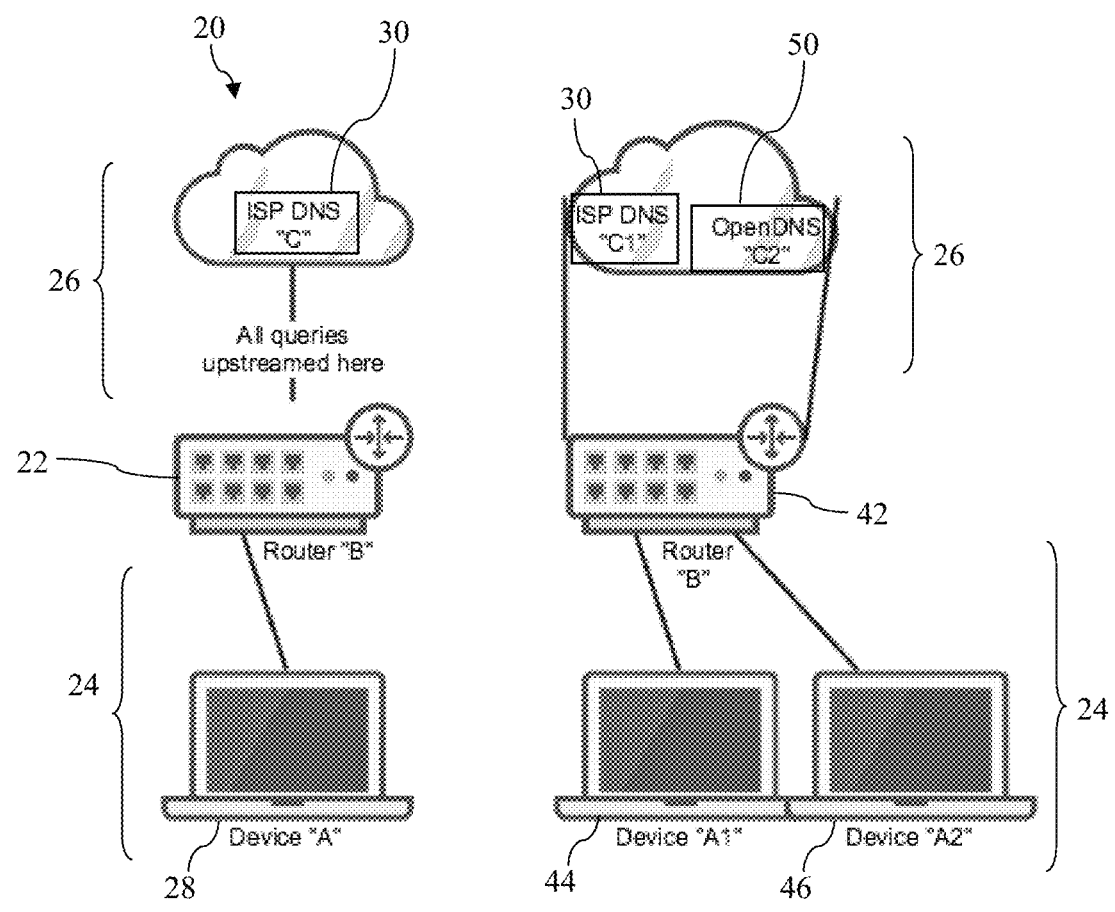
FIG. 1A illustrates in diagrammatic form an example DNS resolution system.
FIG. 1B illustrates in diagrammatic form an example DNS resolution system which uses deterministic DNS.

Reference is now made to FIG. 1A, which illustrates an example DNS resolution system 20. For example, a router 22 (Router "B") can be configured to provide connectivity between a local network 24 and a backhaul network 26. A requestor device 28 (Device "A") can be a user device that is located within the local network 24, such as a computer, laptop, tablet, mobile phone, etc. The local network 24 can include a Local Area Network (LAN) or wireless LAN, for example. The backhaul network 26 can include one or more upstream DNS resolvers 30 (ISP DNS Server "C"). The backhaul network 26 can include the Internet and a Wide Area Network (WAN), for example.

For example, the source requestor device 28 (Device "A") can have a DNS router 22 (router "B") which can be used as a DNS resolver. The LAN-based DNS resolvers 22 can include caching servers which have one or more forwarders or upstream DNS resolvers 30 (Servers "C"). The Servers "C" can be the ISP's DNS server(s). So, "A" asks "B", who, in turn asks "C", and so on, until an answer is found, such as an IP address of the destination, and comes back to the source "A".

FIG. 1B illustrates in diagrammatic form an example DNS resolution system 40 which includes what can be referred to herein as deterministic DNS, in an example embodiment. For example, a router 42 (router "B") can be configured to provide connectivity between the local network 24 and the backhaul network 26. Different source requestor devices 44, 46 are illustrated as Device "A1" and Device "A2", which can be user devices that are located within the local network 24. The backhaul network 26 can include a plurality of upstream DNS resolvers 30, 50, illustrated as ISP DNS "C" and the OpenDNS "C", respectively.

For example, the upstream DNS resolver 30, 50 can be one of the following:

1. ISP-provided DNS server(s): This happens by virtue of setting up an ISP-provided router, or using a router with default settings.

2. Google DNS (8.8.8.8 and 8.8.4.4): This is a service provided by Google and simply responds to DNS specifications and therefore has no safety and filtering aspects.

3. OpenDNS (208.67.22x.xxx): This is a service designed to filter domain names based on a pre-determined set of filtering rules.

In an example embodiment, the router 42 can be configured to handle or tailor DNS requests in a deterministic manner, referred to herein as deterministic DNS, which can follow rules that can account for validation of the particular source requestor devices 44, 46 and/or selection of one of the particular upstream DNS resolvers 30, 50 to complete the DNS request. Additional aspects of deterministic DNS are described in greater detail herein.

Figure 4:
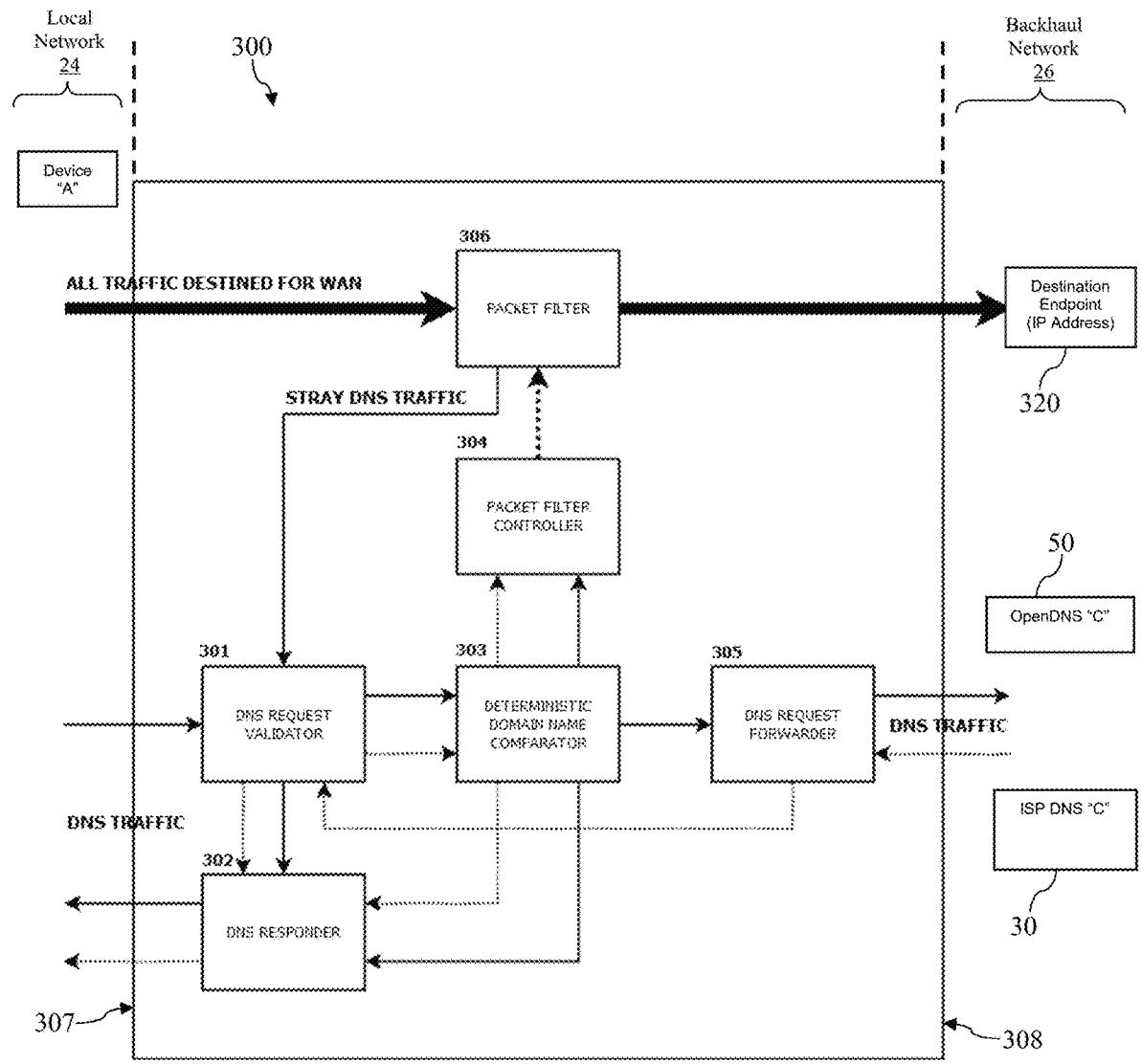
FIG. 4 illustrates in block diagrammatic form an example router, in accordance with an example embodiment.

Reference is now made to FIG. 4, which illustrates a router 300 in accordance with an example embodiment. Generally, the router 300 is configured as a gateway to provide connectivity to devices between the local network 24 and the backhaul network 26. The router 300 is configured to handle DNS queries and forward them to one of the upstream DNS resolvers 30, 50. The router 300 is configured to handle IP traffic flow. In an example embodiment, the handling of IP traffic by the router 300 can be dependent on how previous DNS requests were validated or blocked.

Still referring to FIG. 4, the router 300 is illustrated with blocks or modules, which can represent hardware, software, or a combination of hardware and software, as applicable.

The router 300 can include a computer-readable medium such as memory which stores instructions, and one or more processors (e.g. microprocessors) which have access to the memory in order to implement example processes and instructions described herein. The memory is also used to store IP filter rules and the tuples (or pairs or sets), in example embodiments. Example implementations can be configured within firmware of the router 300, in some example embodiments, due to the high switching speeds required for traffic handling.

As shown in FIG. 4, the router 300 can include DNS request validator 301, DNS responder 302, deterministic domain name comparator 303, packet filter controller 304, DNS request forwarder 305, and packet filter 306. Further, the router 300 includes a local network interface 307 and a backhaul network interface 308. For example, wireless connections (e.g. antenna) and/or wired connections (e.g. Ethernet) can be used.

In an example embodiment, the packet filter 306 can be software tied to the router 300 which processes incoming traffic (packets) destined to the outside world and compares it with a set of rules to decide whether to pass or block such traffic. The packet filter 306 is further managed by using a dynamic set of rules by managing them on the fly through rule updates received from the packet filter controller 304. The packet filter 306, therefore, gets continually modified in order to allow incoming traffic from specific IP addresses reaching destination endpoints (IP addresses) as obtained through previous DNS resolution. Such IP-to-IP rules can be further detailed with protocol and/or source/destination port information.

Figure 2:
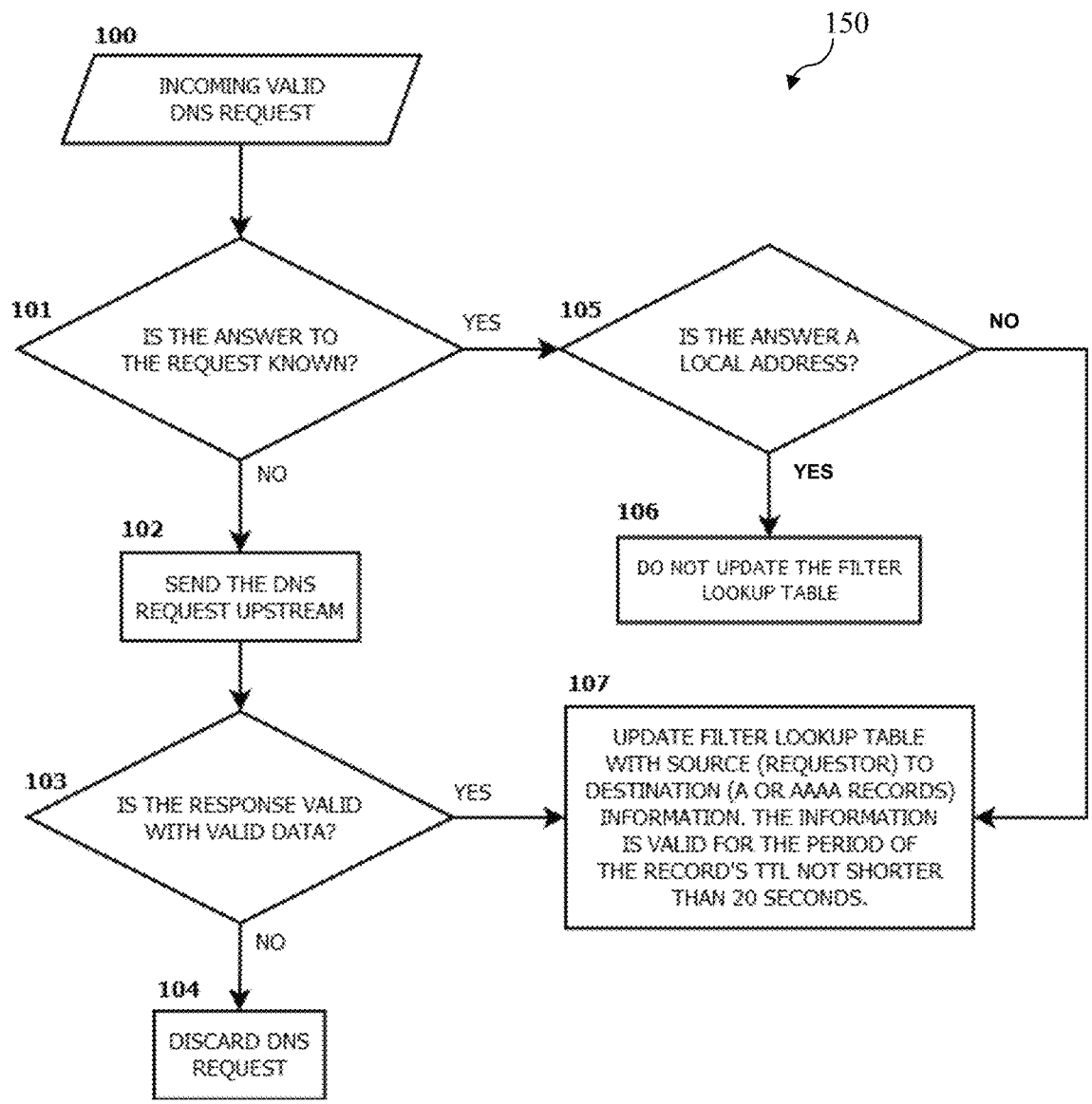
FIG. 2 illustrates a flow diagram of a method for validating a DNS request, in accordance with an example embodiment.
Figure 3:
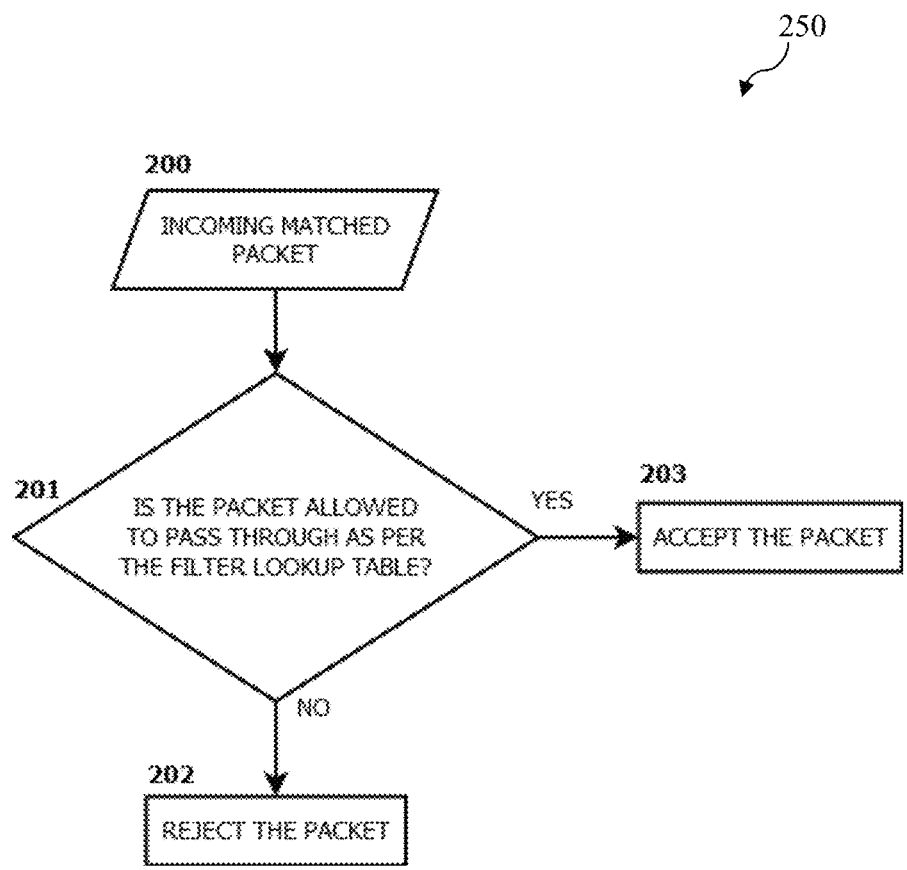
FIG. 3 illustrates a flow diagram of a method for IP traffic filtering, in accordance with an example embodiment.

FIG. 2 illustrates a flow diagram of a method 150 for validating a DNS request, for example implemented by the router 300, in accordance with an example embodiment. FIG. 3 illustrates a flow diagram of a method 250 for IP traffic filtering, for example implemented by the router 300, in accordance with an example embodiment.

Generally, source-destination-time-to-live (SDTTL) tuples are generated by the router 300 through DNS resolution, and stored in a filter lookup table. In an example embodiment, the tuple can include: an IP address of the source requestor device "A" ("source"), an IP address of the destination endpoint 320 that was resolved from the DNS query ("destination"), and the TTL. An incoming DNS request is first tested against centrally controlled and/or user defined rule sets, and if an answer is known and external, an IP filter rule (the tuple) is created or updated. If an answer is not known, or the TTL has expired, an upstream DNS resolver is consulted. Upon receiving a response an SDTTL tuple is created with an expiry period given by TTL and not less than 20 seconds. The resolved address is sent to the source requestor device. A rule is automatically destroyed after it expires, in an example embodiment.

Generally, FIG. 3 shows what happens when an IP packet reaches the filter stack (packet filter 306) of the router 300. When an IP packet reaches the router 300, the packet filter 306 implements rules to filter the received IP packet. For example, the tuples can be used to verify the source, the destination, and the TTL, for example against header information of the received IP packet. Additional filter rules may also need to be passed to match the packet. If a matched packet is verified, the IP packet is permitted to pass and sent to the IP address of the destination endpoint 320. Otherwise, in an example embodiment, the IP packet is blocked (rejected) as a default.

Accordingly, in an example embodiment, the pivot point of the IP enforcement of the router 300 is the source-destination-TTL filter lookup table in the packet filter 306. From one side it is fed with information obtained through DNS resolution by way of creating or updating SDTTL tuples, and from the other side it is consulted by the IP packet filter 306 to permit or block IP traffic.

The method 150 of FIG. 2 will now be described in greater detail. At event 100, a DNS request (which includes a domain name query) is received by the router 300 and is then put through a series of tests by the DNS request validator 301 to validate their compliance with RFC 1035 and related. Those found in non-compliance are either discarded or responded to in a manner respecting their infringement (by the DNS Responder 302). For example, this validation process as described can be applied everywhere herein where there is reference to validating DNS request or response (answer). At event 101, those validated positively are then looked up by the deterministic domain name comparator 303 in a table in memory populated by the processor for tailoring DNS answers to specific requestors (e.g. the source requestor "A" who is doing the asking).

At event 105, if an answer to the DNS request is known and local, the packet filter 306 is not updated (per event 106). At event 107, if an answer (DN_IP_A, DN_IP_B, . . . ) is known (Cached or Authoritative, as described below) and not local, the packet filter 306 is altered by the packet filter controller 304 to update the filter lookup table to include a new SDTTL tuple. This allows the source requestor with IP address A (IP_A) to access destination IP address(es) corresponding to the A or AAAA records for the given DN: DN_IP_A, DN_IP_B, etc. One can refer to this packet filter 306 alteration as creating a hole from IP_A to a set of DN_IP_X. Such hole(s) in the packet filter 306 stays open as long as the DN_IP_A, DN_IP_B, etc. are deemed valid as per their DNS resource record's time-to-live (TTL) option. After the TTL expires these holes in the packet filter 306 are automatically closed or deleted, in an example embodiment.

At event 102, if an answer to the DNS request is not known, in an example embodiment, the request is forwarded by the DNS request forwarder 305 to an upstream server such as upstream DNS resolver 30, 50 (FIG. 1B). At event 103, upon the DNS request forwarder 305 receiving, and the DNS request validator 301 validating, the response from the upstream server, the answer to the original request is deemed known and the process described previously applies (e.g. event 107 performed by the packet filter controller 304). The resolved address is sent to the source requestor device by the DNS responder 302. At event 104, if the original DNS request cannot be validated, the DNS request is discarded and the source requestor device is advised by the DNS responder 302. No rule or tuple is made in such a case.

The method 250 of FIG. 3 will now be described in greater detail. For example, at event 200, when an IP packet reaches the packet filter stack of the router 300, it gets matched by one or more predefined rules and the tuples which allow pass through (e.g. match rules). On Linux, for example, this can fundamentally be done either in the kernel space (e.g., iptables rules) or in the user space (e.g., nfqueue).

At least some example embodiments relate to the way IP filter rules are both a) obtained and b) dynamically created and destroyed. For example, if the decision is to be made in kernel space, the "iptables" rules are propagated and a decision is made according to those one or more predefined rules. If the decision is to be made in kernel space, at event 201, matched packets are further matched or validated by the packet filter 306 which consults its internal and source-destination optimized lookup table, which contains the SDTTL tuples, and passes a verdict back into the kernel. This validation can be done by comparing with SDTTL tuples that were previously generated from successfully validated DNS queries, and stored in the packet filter 306. At event 203, the IP packet can then be sent from the router 300 to the IP address of the destination endpoint 320, should the IP packet be permitted to pass. For example, a previous DNS query was validly resolved. Received IP packets from the destination endpoint 320 are similarly passed through to the original requestor device, by verifying with rules or tuples.

At event 202, the IP packet is otherwise rejected or blocked. For example, a source requestor device may send an IP packet to the router 300 which directly identifies an IP address of the destination endpoint 320. If there was no previous DNS query that was resolved to that IP address, the IP packet is blocked (discarded) by the packet filter 306 and is never sent to the destination endpoint 320.

Referring to FIG. 4, example embodiments of deterministic DNS which can be implemented from router 300 will now be described in greater detail. For example, computer A with IP address IP_A needs to have uspto.gov domain name resolved into an IP address and so it sends a DNS request to the router 300. The router 300 validates the request and looks up the tuple, e.g. can be an IP address-domain name pair (IP_A-domain name). It finds a match-block which effectively prevents computer A from accessing the requested domain name and so it authoritatively responds to computer A. Now, computer B with IP address IP_B desires to have uspto.gov resolved and so it sends a DNS request to the router 300 which finds a match-pass and forwards the DNS request upstream for resolution. Upon receiving a valid response it then passes it back to computer B. The router 300 now has a rule that permits computer B to pass IP traffic to the IP address of uspto.gov. Since no successful validation or rule was made for computer A, traffic is blocked from computer A to the IP address of uspto.gov.

In an example embodiment, deterministic DNS can be used to tailor a DNS query to specific devices within a local area network (LAN) and can avoid leaving a trail that is typically left to DNS providers. For deterministic DNS, for example, the router 300 responds to queries and return content to the originating IP address and originating device based on a profile specific to the originating device in group "A" while addressing filtering, location and speed constraints.

In an example embodiment, deterministic DNS can be used to resolve a DNS query by attempting to resolve the IP address using a multi-step order of operation that incorporates the uses of white, black and rainbow lists and to subsequently allow or block access to a domain based on the rules that are defined by each of the lists. For example, a 7-step order of operation is listed below:

1) Authoritative: Used for user defined list of pairs of domain names and IPv4 or IPv6 addresses to serve upon request.

2) Rainbow List: this is a customized list of domains, sites and services that should not receive any custom filtering treatment, but rather be sent to a non-default DNS server for resolution. The rainbow list is integrated into existing inclusion or exclusion lists (white and black lists) based on a specific sequencing method that prevents conflicts. Typical uses of rainbow lists include:

Local domains that need to be forwarded to an Active Directory server for resolution such as mycompany.local;

Split-DNS zones that resolve differently internally on a network than externally on the Internet;

Exception for a domain that the user wants to be treated differently than the last-resort resolver. For example, if OpenDNS blocks a domain and it's a false positive, then the Rainbow list may address this exception by sending that domain's resolution request to 8.8.8.8 (Google DNS);

Individual domains that otherwise fall into a broad treatment in one of the other lists below; and, Rules to handle a false positive trapped in a Black list. For example, a website with no pornographic content that has been blacklisted by OpenDNS Family Shield. Rainbow lists can be used in any combination of other Rainbow, Black or White lists, in an example embodiment.

3) Black List: Used to disallow individual domains that might otherwise not be blocked with any treatments below. This is the opposite of a white list and includes all sites as it embodies the philosophy of "Allow all, Block some".

4) Override: Used for purposes where a DNS request requires to be processed with a non-standard, yet authoritative treatment for the purposes of achieving different DNS answers. For example, www.google.com is instead resolved as forcesafesearch.google.com and as a result, Google sees the incoming search request in a different channel and can therefore offer different search results.

5) White List: All pre-determined approved websites and domains are included in a white list which embodies the philosophy of "Block all, allow some". It means that anything that is not explicitly listed will be filtered and blocked. This cannot be used in combination with anything else except other White lists or other Rainbow lists. Multiple white lists can be created and combined for easier management. In order to ensure that all relevant domains for any primary domain are included in the White List, an automated crawler will be required to discern all levels of domain names.

6) Everything else including Virtual Relocation: Note also that most bundles are wildcards, for example domain.com in bundles includes a.domain.com and b.domain.com; however, Google SafeSearch is absolute—only google.x and www.google.x are included, where x includes all top level domains (TLDs) listed at https://www.google.com/supported_domains, for example.

7) Resolver of Last Resort: When a domain has no mention in any lists above, it is sent to the resolver of last resort. This is typically the following example, in most-to-least frequent preference: OpenDNS (take advantage of filtering and performance); GoogleDNS (take advantage of strict RFC compliance and reasonable performance); and ISP (should be best performance, but not always, but subject to ISP DNS treatment, such as advertisement injections).

In an example embodiment, at least some or all of these steps are performed in the above-noted order of operations of 1) to 7).

It may be appreciated that deterministic DNS allows programmable, user-specific, content filtering on individual devices within a LAN (even though they all share a common external IP address), and virtual relocation to overcome geo-blocking and high-speed delivery of content from Content Delivery Networks (CDN).

Referring again to FIG. 1B, it may be appreciated that deterministic DNS eliminates the trail of "bread crumbs" that are left when queries are sent through traditional DNS routings, thus preventing user behavioural profiling. It may allow different geo-identities without the use of a VPN through the use of an "inverse proxy" method. Furthermore, techniques to dynamically update both white and black lists to allow users to easily customize content blocking rules and to stay current are included in the deterministic DNS system.

The development and use of a recursive algorithm optimizes the use of Content Delivery Networks (CDN) and maximizes the speed of content delivery without breaking the CDN which is often the case with existing technologies such as Google DNS or OpenDNS.

The capabilities of the Deterministic DNS in the router 300 can include:

Ability to integrate with third party content blocking cloud services;

Blocking third party advertisements;

Blocking behavioral profiling;

Changing DNS at LAN router level;

Change DNS at computer level to protect specific users;

Accessing international content with no loss of speed or latency;

Accessing White or Black list websites;

Managing multiple locations and device from one Dashboard;

Providing as many on-premises DNS resolutions as possible on a cached basis;

Distributes DNS queries based on the user's specific needs and preferences; and, Allows the user to select the DNS resolver of last resort that is used if none of the filtering applies to a given query.

During testing, for example, a typical 6 mbps Internet connection only uses about 1-2 mbps when downloading a movie from iTunes. However, using deterministic DNS in the router 300, it forwards queries intelligently based on domains that are part of known CDNs. In other words: iTunes' CDN, gets its DNS queries forwarded selectively to the local ISP DNS 30 (FIG. 1B) thus utilizing full 6 mbps bandwidth capacity, because it connects to the closest geographical located server. Latency has been shown to decrease from 50 ms to less than 30 ms with the Deterministic DNS router 300.

Examples of IPE passes/violations and testing are summarized in Table 1.

TABLE 1

| Resource | Pass/fail |
| --- | --- |
| http://66.35.53.194 | Fail (was not preceded with a DNS lookup to resolve to that IP address) |
| http://webroot.coln | Pass (assuming webroot.com is not on a blacklist, or is present on a whitelist) |
| Embedded base64 code in infected WordPress site that pulls malware installer from ftp://5.6.7.8/somefile.malware | Fail since 5.6.7.8 was not resolved by DNS first |
| NTP client on Internet-of-things device is using 17.151.0.151 as NTP server to sync time | Fail because a static IP was used and not preceded with DNS lookup |
| NTP client on Internet-of-things device uses ca.pool.ntp.org | Pass (as long as ca.pool.ntp.org is not on a blacklist, or is present in a whitelist) |
| Skype instant messaging which is relayed through Microsoft's servers (and archived) | Pass (as long as skype.net and skype.com are not on a blacklist or present on a whitelist) |
| Skype voice and video | Fail because peer-to-peer traffic did not originate with DNS queries |
| BitTorrent large file sharing | Fail because peer-to-peer traffic did not originate with DNS queries |

TABLE 1-continued

| Resource | Pass/fail |
| --- | --- |
| Ransomware, after its dropper infection (which could come in via usb, for example) attempts to access its owner's private key resource to begin encrypting. | Fail, provided the device is on a whitelist without that ransomware author's site being listed |

As recognized herein, based on the testing, the impact of IPE can be extensive, as shown in Table 2.

TABLE 2

| Impact | Desired/Undesired | Details |
| --- | --- | --- |
| Misbehaving applications up to layer 7 blocked | Desired | Includes base64 direct-IP calls in javascript all blocked |
| Skype voice and video is broken | Desired | There has typically been a continuous struggle with conventional difficulties on "How to block Skype" |
| Other peer-to-peer apps are broken | Desired | Encrypted P2P traffic is difficult but desired to be blocked |

From the foregoing, it may be appreciated that IPE (IP Enforcement) can be configured into the router 300 firmware to allow TCP and UDP traffic through a compatible gateway only when the destination IP was the result of a prior DNS query still in its TTL (time to live) period. All IP connectivity that did not originate with a DNS query is blocked by default. One or more further match rules can be implemented to determine whether to permit the traffic.

Figure 5:
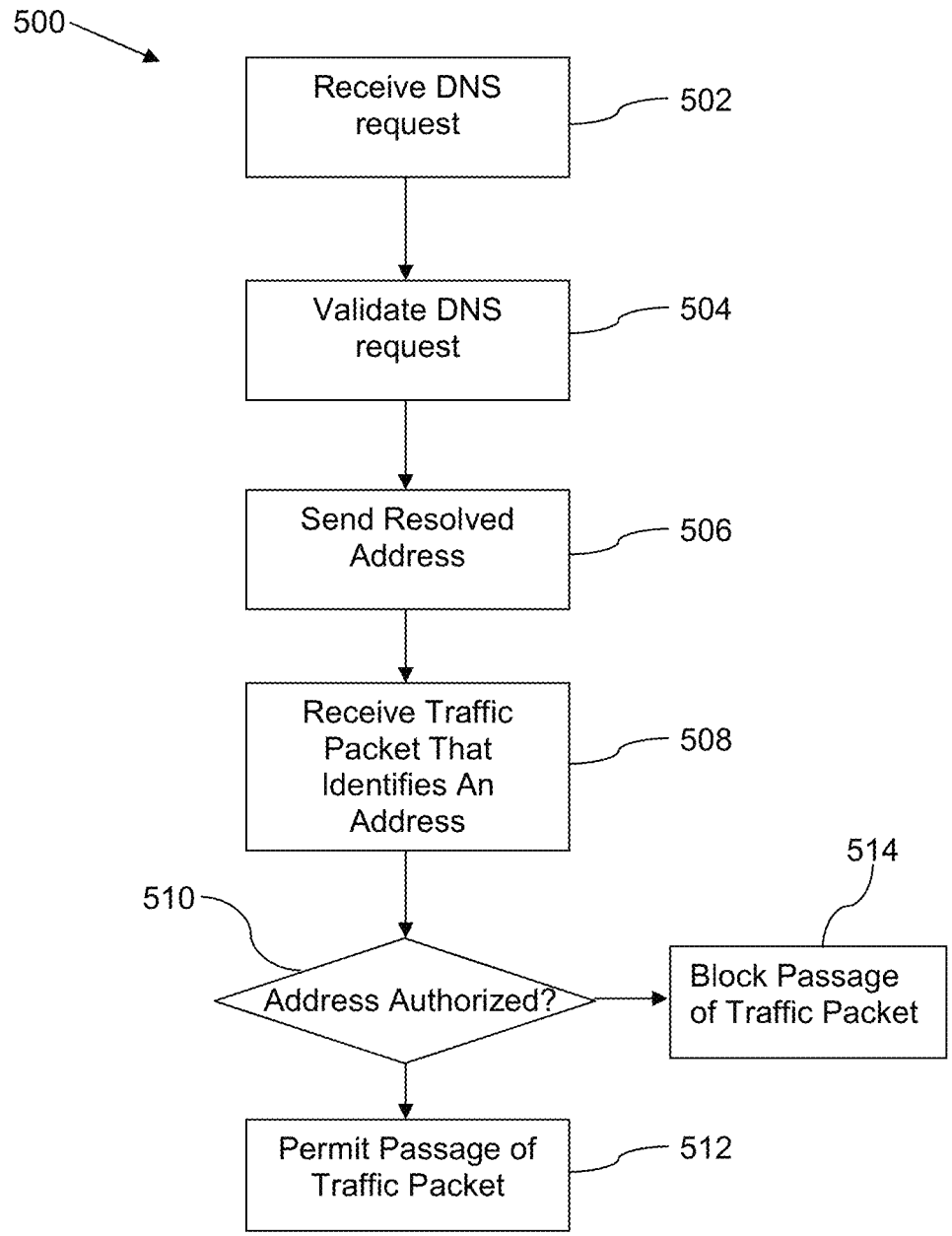
FIG. 5 illustrates a flow diagram of a method for IP traffic filtering, in accordance with another example embodiment.

FIG. 5 illustrates a flow diagram of an example method 500 implemented by the router 300 for IP traffic filtering, in accordance with another example embodiment. At event 502, the method 500 includes receiving, from the requestor device, a Domain Name Service (DNS) request including a domain name query. At event 504, the method 500 includes validating the DNS request. At event 506, the method 500 includes sending a resolved address based from said validating of the DNS request. At event 508, the method 500 includes receiving traffic (e.g. a packet) which identifies an address. At event 510, the method 500 determines whether the identified address is authorized (verified). At event 512, the method 500 permits passage of the traffic packet when the address is verified. At event 514, the method 500 blocks passage of the traffic packet when the address is not authorized (not verified).

For example, in an example embodiment, event 510 includes verifying that the address identified any one of the resolved addresses. For example, in another example embodiment, event 510 includes verifying that the address identifies the requestor device. For example, in another example embodiment, event 510 includes verifying that the traffic (e.g. packet) identifies both the requestor device and any one of the resolved addresses. The method 500 can be repeated for other received traffic packets, as applicable.

In terms of hardware integration, it may be appreciated that the described implementations may be built into firmware of a router/gateway appliance. The appliance typically has hardware, software, a housing and a power supply. Example embodiments include combining of routing services with the dynamic nature of DNS, for example to combine both connect access control and DNS.

In some example embodiments, the particular rules or tuples in the packet filter 306 can be generated and stored in a number of ways, including records, databases, tables, lists, or other data structures or logical constructs.

In some example embodiments, the particular identified address of the requestor device or the destination endpoint can include media access control address (MAC) addresses or other suitable addresses.

In some example embodiments, as appropriate, each illustrated block or module may represent software, hardware, or a combination of hardware and software. Further, some of the blocks or modules may be combined in other example embodiments, and more or less blocks or modules may be present in other example embodiments. Furthermore, some of the blocks or modules may be separated into a number of sub-blocks or sub-modules in other embodiments.

While some of the present embodiments are described in terms of methods, a person of ordinary skill in the art will understand that present embodiments are also directed to various apparatus including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods and systems. It is understood that such apparatus, articles of manufacture, and computer data signals also come within the scope of the present example embodiments.

While some of the above examples have been described as occurring in a particular order, it will be appreciated to persons skilled in the art that some of the messages or steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps of the conversations may be repeated, as necessary. Elements described as methods or steps similarly apply to systems or subcomponents, and vice-versa.

In example embodiments, the local network interface 307 and/or the backhaul network interface 308 can be configured to communicate by way of a physical interface and/or a wireless interface, as applicable. As applicable, the physical interface may comprise one or combinations of an Ethernet connection, Universal Serial Bus (USB) connection, Firewire™ (also known as an IEEE 1394 interface) connection, or other serial or parallel data connection. As applicable, the wireless interface may be include a short-range wireless connection which may comprise one or a combination of an infrared (IR) connection such as an Infrared Data Association (IrDA) connection, a short-range radio frequency (RF) connection such as one specified by IEEE 802.15.1 or the Bluetooth® special interest group, or IEEE 802.15.3a, also referred to as UltraWideband (UWB), or other personal area network (PAN) connection. The wireless interface may be configured to connect to the Internet over a Wireless Local Area Network (WLAN), for example, IEEE 802.11x standards (sometimes referred to as Wi-Fi), IEEE 802.11n, IEEE 802.16e (also referred to as Worldwide Interoperability for Microwave Access or "WiMAX"), and/or IEEE 802.20 (also referred to as Mobile Wireless Broadband Access). The wireless interface can be configured to connect to a Wireless Wide Area Network (WWAN) which conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), HSUPA (High-Speed Uplink Packet Access), 3G, 3GPP Long Term Evolution (LTE), 4G, 4G LTE, draft or standardized higher generation networks, IEEE 802.16e (also referred to as Worldwide Interoperability for Microwave Access or "WiMAX"), or various other networks.

The term "computer readable medium" as used herein includes any medium which can store instructions, program steps, or the like, for use by or execution by a computer or other computing device including, but not limited to: firmware, magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method performed by a router which provides connectivity between a local network and a backhaul network, wherein the local network includes a requestor device, the method comprising:
   receiving, from the requestor device of the local network, a Domain Name Service (DNS) request including a domain name query;
   validating the DNS request;
   sending a resolved address based from said validating of the DNS request to the requestor device of the local network;

storing or updating a record, in a memory of the router as a consequence to successful validating of the DNS request, the record including i) an address of the requestor device of the local network, and ii) the resolved address from the DNS request;

receiving IP traffic which identifies an address, wherein the IP traffic originates from the local network and is destined for the backhaul network; and permitting passage of the IP traffic between the specific address of the requestor device and the resolved address, by verifying against the record, that the address identified in the traffic is the resolved address in the record, and a requestor address contained in the traffic is the address of the requestor device stored in the record;

wherein said validating the DNS request includes sending a request to a selected one of a plurality of upstream DNS resolvers, wherein selection of the upstream DNS resolver is dependent on rules, wherein the rules include:
1) authoritative pairs,
2) rainbow list,
3) black list,
4) override,
5) white list,
6) virtual relocation, and
7) resolver of last resort.

2. The method as claimed in claim 1, further comprising determining a time-to-live (TTL) of the resolved address, wherein said permitting passage of the IP traffic is further permitted when the IP traffic is received within the TTL.

3. The method as claimed in claim 2, further comprising removing the record from memory after expiry of the TTL.

4. The method as claimed in claim 1, wherein the router is configured to block traffic that i) identifies the resolved address, and ii) does not originate from the address of the requestor device stored in the record.

5. The method as claimed in claim 1, wherein the record is stored as a tuple in the memory.

6. The method as claimed in claim 5, wherein the tuple includes: the address of the requestor address comprising an IP address of the requestor device, an IP address of the resolved address from the DNS request.

7. The method as claimed in claim 6, wherein the tuple further includes: a time-to-live (TTL) of the resolved address, wherein said permitting passage of the IP traffic is permitted when the IP traffic is received within the TTL.

8. The method as claimed in claim 5, wherein the tuple is stored in a lookup table in the memory.

9. The method as claimed in claim 1, wherein said rules are implemented in a specified order.

10. The method as claimed in claim 1, wherein said rules are implemented in a specified order that is from the rules 1) to 7).

11. The method as claimed in claim 1, wherein the resolved address is an Internet Protocol (IP) address of a destination endpoint.

12. The method as claimed in claim 1, further comprising blocking passage of the IP traffic as a default and/or when the address is not any of the resolved addresses.

13. The method as claimed in claim 1, further comprising:
receiving a second Domain Name Service (DNS) request;
validating the second DNS request; and
sending a second resolved address based from said validating of the second DNS request,
wherein said any one of the resolved addresses includes the second resolved address.

14. The method as claimed in claim 1, wherein said traffic comprises a packet that identifies the address.

15. The method as claimed in claim 1, wherein IP traffic of any other devices of the local network is blocked by the router as a default.

16. A router for providing connectivity between a local network and a backhaul network, the router comprising:
memory;
a first network interface configured to interface with the local network, including a requestor device within the local network;
a second network interface configured to interface with the backhaul network; and
one or more processors configured to execute instructions stored in memory to:
receive, from the requestor device of the local network, a Domain Name Service (DNS) request including a domain name query;
validate the DNS request;
send a resolved address based from said validating of the DNS request to the requestor device of the local network;
store or update a record, in a memory of the router as a consequence to successful validating of the DNS request, the record including i) an address of the requestor device of the local network, and ii) the resolved address from the DNS request;
receive IP traffic which identifies an address, wherein the IP traffic originates from the local network and is destined for the backhaul network; and
permit passage of the IP traffic between the specific address of the requestor device and the resolved address, by verifying against the record, that the address identified in the traffic is the resolved address in the record, and a requestor address contained in the traffic is the address of the requestor device stored in the record;
wherein said validating the DNS request includes sending a request to a selected one of a plurality of upstream DNS resolvers, wherein selection of the upstream DNS resolver is dependent on rules, wherein the rules include:
1) authoritative pairs,
2) rainbow list,
3) black list,
4) override,
5) white list,
6) virtual relocation, and
7) resolver of last resort.

17. A non-transitory computer readable medium comprising instructions which are executable by one or more processors of a router, wherein the router provides connectivity between a local network and a backhaul network, the instructions comprising:
instructions for receiving, from the requestor device of the local network, a Domain Name Service (DNS) request including a domain name query;
instructions for validating the DNS request;
instructions for sending a resolved address based from said validating of the DNS request to the requestor device of the local network;
instructions for storing or updating a record, in a memory of the router as a consequence to successful validating of the DNS request, the record including i) an address of the requestor device of the local network, and ii) the resolved address from the DNS request;

instructions for receiving IP traffic which identifies an address, wherein the IP traffic originates from the local network and is destined for the backhaul network; and instructions for permitting passage of the IP traffic between the specific address of the requestor device and the resolved address, by verifying against the record, that the address identified in the traffic is the resolved address in the record, and a requestor address contained in the traffic is the address of the requestor device stored in the record;

wherein said validating the DNS request includes sending a request to a selected one of a plurality of upstream DNS resolvers, wherein selection of the upstream DNS resolver is dependent on rules, wherein the rules include:
1) authoritative pairs,
2) rainbow list,
3) black list,
4) override,
5) white list,
6) virtual relocation, and
7) resolver of last resort.

\* \* \* \* \*